(12) United States Patent
Sugimoto et al.

(10) Patent No.: US 10,428,995 B2
(45) Date of Patent: Oct. 1, 2019

(54) HEAT-INSULATED PIPE ARRANGEMENT

(71) Applicant: NITTA CORPORATION, Osaka-shi, Osaka (JP)

(72) Inventors: Kei Sugimoto, Nabari (JP); Kazuhiro Shimamura, Nabari (JP)

(73) Assignee: NITTA CORPORATION, Osaka (JP)

( * ) Notice: Subject to any disclaimer, the term of this patent is extended or adjusted under 35 U.S.C. 154(b) by 100 days.

(21) Appl. No.: 15/515,133

(22) PCT Filed: Sep. 14, 2015

(86) PCT No.: PCT/JP2015/075994
§ 371 (c)(1),
(2) Date: Mar. 28, 2017

(87) PCT Pub. No.: WO2016/052156
PCT Pub. Date: Apr. 7, 2016

(65) Prior Publication Data
US 2017/0241585 A1    Aug. 24, 2017

(30) Foreign Application Priority Data

Sep. 30, 2014  (JP) .................................. 2014-200983

(51) Int. Cl.
*F16L 59/02*    (2006.01)
*F01N 3/08*     (2006.01)
(Continued)

(52) U.S. Cl.
CPC .............. *F16L 59/022* (2013.01); *F01N 3/08* (2013.01); *F01N 3/2066* (2013.01); *F01N 3/26* (2013.01);
(Continued)

(58) Field of Classification Search
CPC ............................. F16L 59/022; F16L 55/023
(Continued)

(56) References Cited

U.S. PATENT DOCUMENTS 3,557,840 A * 1/1971 Maybee ................ F16L 59/026
                                                         138/149
3,602,636 A * 8/1971 Evans .................... H01B 7/285
                                                         174/115

(Continued)

FOREIGN PATENT DOCUMENTS

DE    102006017414 A1    10/2007
JP    1990-046394         2/1990
(Continued)

OTHER PUBLICATIONS

International Search Report dated Nov. 10, 2015 in International Application No. PCT/JP2015/075994.
(Continued)

*Primary Examiner* — Patrick F Brinson
(74) *Attorney, Agent, or Firm* — Wentsler LLC

(57) ABSTRACT

A heat-insulated pipe assembly includes a pipe allowing a fluid to flow therethrough, and a heat insulating member covers at least a part of the pipe. The pipe is used in an exhaust gas purification system using an SCR catalyst. The heat insulating member has a closed-cell structure and suppresses an increase in a temperature of the fluid due to heat exchange with air. In the exhaust gas purification system using the SCR catalyst, the interior of the pipes is thermally insulated from the exterior by the heat insulating member. Thereby an increase in the temperature of the fluid flowing through the pipe due to heat exchange with air is suppressed.

8 Claims, 5 Drawing Sheets

(51) Int. Cl.
*F01N 3/26* (2006.01)
*F16L 59/14* (2006.01)
*F16L 53/32* (2018.01)
*F01N 3/20* (2006.01)
*F16L 9/19* (2006.01)

(52) U.S. Cl.
CPC .............. *F16L 9/20* (2013.01); *F16L 53/32* (2018.01); *F16L 59/02* (2013.01); *F16L 59/14* (2013.01); *F01N 2260/20* (2013.01); *F01N 2610/02* (2013.01); *F01N 2610/10* (2013.01); *F01N 2610/14* (2013.01); *F01N 2610/1473* (2013.01); *Y02T 10/24* (2013.01)

(58) Field of Classification Search
USPC .............. 138/151, 156, 149; 428/36.91
See application file for complete search history.

(56) References Cited

U.S. PATENT DOCUMENTS

| | | | | |
|---|---|---|---|---|
| 3,633,630 A * | 1/1972 | Hanson | ............... | C08J 9/14 138/149 |
| 3,757,031 A * | 9/1973 | Izraeli | ............... | H02G 15/113 138/155 |
| 3,853,149 A * | 12/1974 | Stine | ............... | F16L 53/00 138/111 |
| 4,399,319 A * | 8/1983 | Zinn | ............... | F16L 11/127 174/47 |
| 4,713,271 A * | 12/1987 | Searl | ............... | B29C 44/3442 138/103 |
| 5,400,602 A * | 3/1995 | Chang | ............... | A61B 18/02 128/DIG. 27 |
| 5,421,371 A * | 6/1995 | Lauer | ............... | F16L 59/022 138/110 |
| 5,690,147 A * | 11/1997 | Cridland | ............... | F16L 59/023 138/147 |
| 8,261,558 B2 * | 9/2012 | Cao | ............... | B32B 1/08 62/50.7 |
| 2009/0071132 A1 | 3/2009 | Schmelter et al. | | |
| 2009/0242062 A1 | 10/2009 | Sawada | | |
| 2014/0305534 A1* | 10/2014 | Peil | ............... | F16L 59/029 138/151 |
| 2015/0114510 A1* | 4/2015 | Zettell | ............... | F16L 59/023 138/149 |

FOREIGN PATENT DOCUMENTS

| | | |
|---|---|---|
| JP | 1995-004997 U | 1/1995 |
| JP | H11-37379 | 2/1999 |
| JP | 2003-194290 | 7/2003 |
| JP | 2006-273973 | 10/2006 |
| JP | 2007198709 A | 8/2007 |
| JP | 2009-250271 | 10/2009 |
| JP | 2011-241734 | 12/2011 |
| JP | 2013-76437 | 4/2013 |
| WO | 2009014516 A1 | 1/2009 |

OTHER PUBLICATIONS

Extended European Search Report dated Feb. 5, 2018 in corresponding application EP15847946.9.
Office action dated Jul. 23, 2018 in parent Japanese Patent Application No. 2014-200983.
Second Office action in parent Japanese Patent Application No. 2014-200983, drafted Dec. 17, 2018, dated Dec. 25, 2018.

* cited by examiner

| | Example 1 | Example 2 | Example 3 | Example 4 | Example 5 | Example 6 | Comparative Example 1 | Comparative Example 2 |
|---|---|---|---|---|---|---|---|---|
| Temperature difference (°C) | 1.8 | 1.8 | 2.0 | 1.4 | 1.5 | 1.6 | 10.3 | 8.9 |
| Outermost diameter (mm) | 31 | 37 | 34 | 28 | 28 | 26 | 8 | 14 |
| Cross section |  |  |  |  |  |  |  |  |

HEAT-INSULATED PIPE ARRANGEMENT

TECHNICAL FIELD

The present invention relates to a heat-insulated pipe assembly.

BACKGROUND ART

Vehicles and the like including a diesel engine that emits nitrogen oxides (hereinafter referred to as NOx) employ an exhaust gas purification system (hereinafter referred to as SCR system) using a selective catalytic reduction (SCR) catalyst to remove NOx. The SCR system includes a spray nozzle and the SCR catalyst. The spray nozzle sprays aqueous urea into an exhaust pipe, in which an exhaust gas from the engine flows. The SCR catalyst is disposed downstream of the spray nozzle. In the SCR system, the aqueous urea is sprayed to a high-temperature exhaust gas flowing through the exhaust pipe upon the discharge of exhaust gas from the engine to the exhaust pipe. The heat of the exhaust gas results in hydrolysis of urea to ammonia. The resulting ammonia flows downstream through the exhaust pipe together with the exhaust gas and then reaches the SCR catalyst. The SCR catalyst promotes the chemical reaction between ammonia and NOx in the exhaust gas, and NOx is converted into water and nitrogen.

In the SCR system, the spray nozzle is connected to an aqueous urea tank through a pipe, and the aqueous urea in the tank is supplied to the spray nozzle through the pipe as appropriate. In the SCR system, however, since the freezing point of the aqueous urea is approximately −11° C., the aqueous urea in the pipe is frozen and cannot be supplied to the spray nozzle in cold climate areas. To solve this problem, a technique that prevents freezing of the aqueous urea in the pipe has been developed. For example, Patent Literature 1 discloses a liquid transporting pipe in which a connecting portion between a pipe joint and a pipe and a pipe adjacent to the connecting portion are covered by a dissipation preventing cover, and a cord heater is inserted in the pipe.

CITATION LIST

Patent Literature

Patent Literature 1: Japanese Patent Laid-Open No. 2009-250271

SUMMARY OF INVENTION

Technical Problem

Since the exhaust pipe is disposed close to the engine, which emits heat of high temperature, an ambient temperature around the pipe connected to the exhaust pipe is very high. Accordingly, the temperature of the aqueous urea in the pipe increases due to heat exchange with air and exceeds an allowable level, causing evaporation and too high concentration, which may produce ammonia. To solve this problem, in conventional methods, a heat shield plate has been disposed between the pipe and a heat source to suppress the increase in the temperature of the aqueous urea but has not been effective.

In view of the foregoing problems, an object of the present invention is to provide a heat-insulated pipe assembly capable of suppressing an increase in a temperature in a pipe due to heat exchange with air.

Solution to Problem

A heat-insulated pipe assembly of the present invention includes a pipe allowing a fluid to flow therethrough and a heat insulating member covers at least a part of the pipe. The pipe is used in an exhaust gas purification system using an SCR catalyst. The heat insulating member has a closed-cell structure and is configured to suppress an increase in a temperature of the fluid due to heat exchange with air.

Advantageous Effects of Invention

The heat-insulated pipe assembly of the present invention includes the pipe allowing a fluid to flow therethrough and the heat insulating member covers at least a part of the pipe. The pipe is used in the exhaust gas purification system using the SCR catalyst, and the heat insulating member has the closed-cell structure and is configured to suppress the increase in the temperature of the fluid due to the heat exchange with air. Hence, in the exhaust gas purification system using the SCR catalyst, the interior of the pipe is thermally insulated from the exterior by the heat insulating member. Thereby, the increase in the temperature of the fluid flowing through the pipe due to heat exchange with air is suppressed.

DESCRIPTION OF EMBODIMENT

1. Structure of Heat-insulated Pipe Assembly

Figure 1:
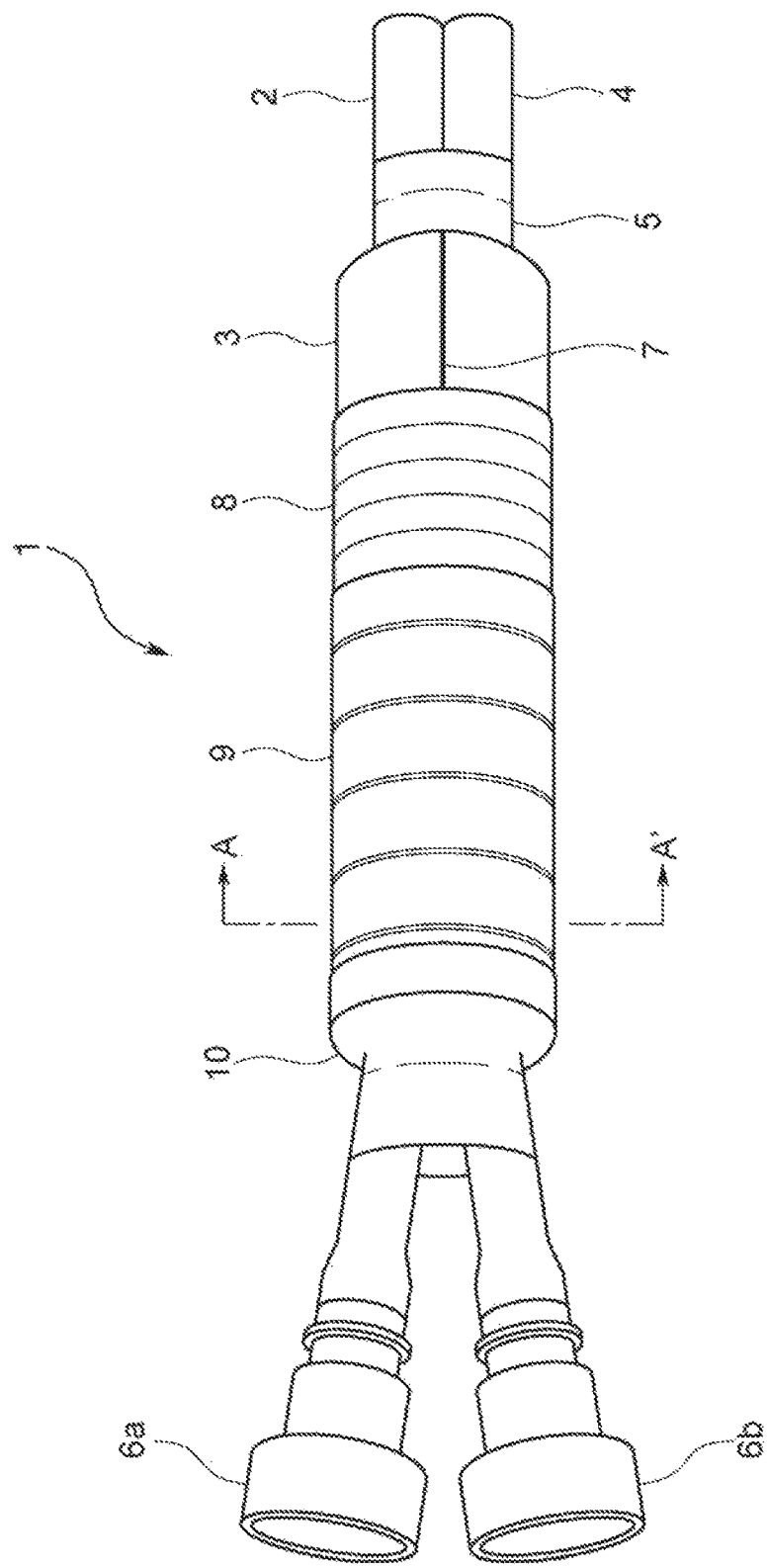
FIG. 1 is a partial perspective view showing the entire structure of a heat-insulated pipe assembly according to an embodiment of the present invention.

The heat-insulated pipe assembly 1 shown in FIG. 1 includes a pipe 2 allowing a fluid to flow therethrough, and a heat insulating member 3 covering, at least a part of the pipe 2. The heat-insulated pipe assembly 1 further includes a hot water pipe 4. The hot water pipe 4 is disposed along the pipe 2. The hot water pipe 4 allows the heated fluid to flow therethrough. The pipe 2 and the hot water pipe 4 have flexibility and have cylindrical shape(s). Material(s) of the pipe 2 and the hot water pipe 4 is selected in accordance with the liquids flowing therethrough. The material of the pipe 2 is selected to allow aqueous urea, being the fluid, to flow through the pipe 2. The material of the hot water pipe 4 is selected to allow an antifreeze, being the heated fluid, to flow through the hot water pipe 4. In this embodiment, the pipe 2 and the hot water pipe 4 are made from resin(s).

The pipe 2 and the hot water pipe 4 are fastened together by a binding member 5 such that their surfaces come into contact with each other. In this embodiment, the binding member 5 is a tape-shaped member helically and closely wrapped around the surfaces of the pipe 2 and the hot water pipe 4 with their surfaces in contact with each other, thereby fastening the pipe 2 and the hot water pipe 4 together. In this embodiment, the tape-shaped member is not adhesive. The tape-shaped member may be adhesive.

The pipe 2 includes a joint 6a at one end and another joint, which is not shown in the drawing, at the other end. The joint 6a facilitates connection to a unit. Similarly, the hot water pipe 4 has a joint 6b at one end and another joint, which is not shown in the drawing, at the other end. In this embodiment, the joints 6a and 6b are female joints made from resin. The joints may be male joints. Each of the pipe 2 and the hot water pipe 4 may have a joint only at one end or may have no joints.

The heat insulating member 3 is composed of a member having a closed-cell structure and which has flexibility like elastomer, for example. In the closed-cell structure, adjacent foams are not connected to each other and a plurality of foams are independent from each other. The heat insulating member 3 is formed from, for example, an ethylene propylene diene-based synthetic rubber, a nitrile-based synthetic rubber, or the like. The heat insulating member 3 has a hollow cylindrical shape. The pipe 2 and the hot water pipe 4 are inserted into and disposed in the hollow portion of the heat insulating member 3 so that the heat insulating member 3 covers at least a part of the pipe 2 and at least a part of the hot water pipe 4. The heat insulating member 3 includes a slit 7 extending in a longitudinal direction. The pipe 2 and the hot water pipe 4 are inserted Into the inside through the slit 7.

The heat insulating member 3 is covered with a protective member 8 having abrasion resistance for protection from external impact. In this embodiment, the protective member 8 is a tape-shaped member having high heat resistance and abrasion resistance, and helically and closely wrapped around the surface of the heat Insulating member 3. Thus, the protective member 8 protects the heat insulating member 3 from an external impact, thereby suppressing the deterioration of the heat insulation performance of the heat insulating member 3 due to an external impact.

The protective member 8 covering the surface of the heat insulating member 3 is covered with a protective member 9. The protective member 9 has elastic and adhesive properties. In this embodiment, the protective member 9 is a tape-shaped member having high elasticity, adhesion, and heat resistance. The protective member 9 is helically and closely wrapped around the surface of the protective member 8. Consequently, the protective member 8 is fastened with the protective member 9, so that peeling of the protective member 8 is suppressed. Thus, the heat insulating member 3 is protected from an external impact, and a reduction in heat insulation performance of the heat insulating member 3 is prevented.

The protective members 8 and 9 may not be particularly limited but preferably have heat resistance. This is because the protective members 8 and 9 do not degrade in high temperature atmosphere and maintain their functions. Thus, the heat resistance of the heat-insulated pipe assembly 1 improves. The heat-insulated pipe assembly 1 suppresses a reduction in the heat insulation performance in the high temperature atmosphere. An increase in the temperature of the fluid flowing through the pipe 2 is suppressed more reliably.

In this embodiment, the protective members 8 and 9 are tape-shaped members. The shapes of the protective members 8 and 9 are not particularly limited as long as the protective members 8 and 9 protect the heat insulating member 3. For example, the protective members 8 and 9 may be tubular-shaped members.

As shown in FIG. 1, one end of the heat insulating member 3 is fixed to the pipe 2 and the hot water pipe 4 with a fastening member 10, and so is the other end (not shown) of the heat insulating member 3. In this embodiment, the fastening member 10 is an adhesive tape-shaped member and helically and closely wrapped around each of the ends of the heat insulating member 3, thereby fixing the heat insulating member 3 to the pipe 2 and the hot water pipe 4.

Figure 2:
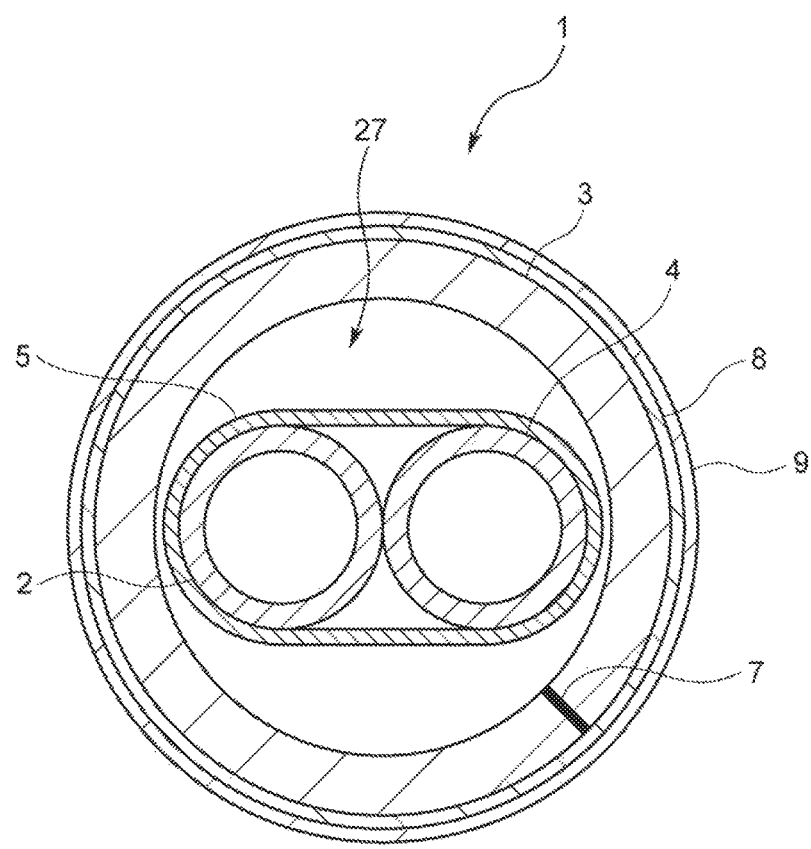
FIG. 2 is an end view of a heat-insulated pipe assembly according to an embodiment of the present invention along line A-A' in FIG. 1.

As shown in FIG. 2, the pipe 2 and the hot water pipe 4 fastened together by the binding member 5 is disposed at the center in the heat-insulated pipe assembly 1. The heat insulating member 3 with the slit 7 surrounds the pipe 2 and the hot water pipe 4. In the heat-insulated pipe assembly 1, the heat insulating member 3 is covered with the protective member 8 covered with the protective member 9. In this embodiment, there is a gap 27 between the pipe 2 and the hot water pipe 4 fastened together and the heat insulating member 3. The pipe 2 and the hot water pipe 4 may be in close contact with the heat insulating member 3, making the gap 27 small.

2. Operation and Effects

Figure 3:
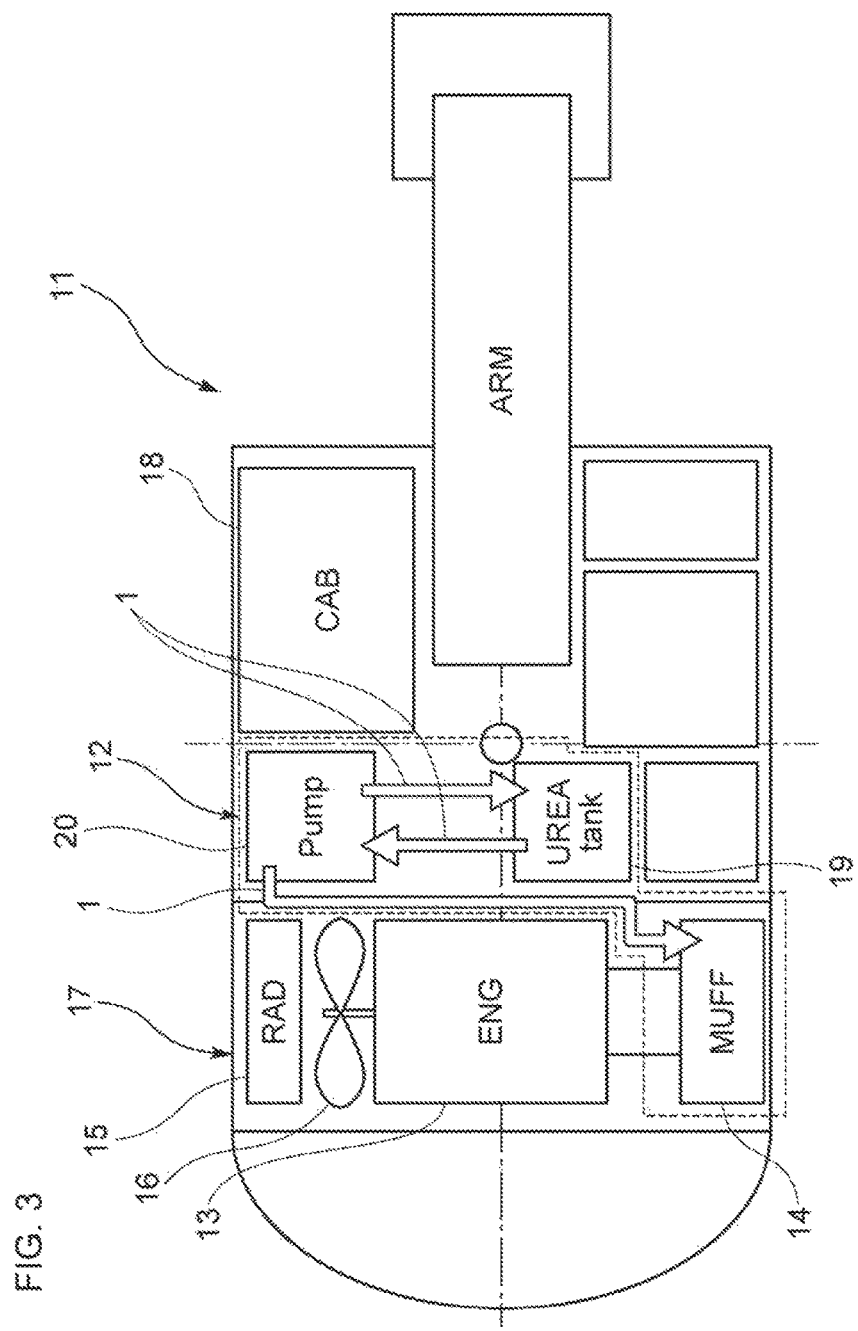
FIG. 3 is a schematic view of a construction machine using a heat-insulated pipe assembly according to an embodiment of the present invention.

As shown in FIG. 3, the heat-insulated pipe assembly 1 is used, for example, in an SCR system 12 of a construction machine 11. The construction machine 11 is, for example, a loading shovel or the like used for construction. The construction machine 11 includes an engine 13, an exhaust pipe 14, through which an exhaust gas from the engine 13 flows, a radiator 15 releasing heat to the outside, an engine room 17 containing a cooling fan 16 cooling the radiator 15, and a cabin 18 for an operator of the construction machine 11. The SCR system 12 is disposed in a space between the cabin 18 at the front of the machine and the engine room 17 at the rear of the machine.

The engine 13 is connected to the radiator 15 via two pipes not shown in the drawing. The pipes are provided with a pump not shown in the drawing so that the antifreeze circulates between the engine 13 and the radiator 15. With the use of the pump, the antifreeze discharged from the radiator 15 is supplied to the engine 13 through the pipes and cools the engine 13. The antifreeze heated by cooling the engine 13 is discharged from the engine 13 and supplied to the radiator 15 through the pipes. The heated antifreeze is cooled in the radiator 15 and then supplied to the engine 13. Thus, the engine 13 is cooled by the circulation of the antifreeze between the engine 13 and the radiator 15.

The SCR system 12 includes the heat-insulated pipe assemblies 1, the exhaust pipe 14, the aqueous urea tank 19, and the pump 20. The exhaust pipe 14 includes a spray nozzle (not shown in the drawing). The spray nozzle sprays aqueous urea into the exhaust pipe 14. The exhaust pipe 14 further includes an SCR catalyst (not shown in the drawing) downstream of the spray nozzle. The pump 20 is connected to the pipes 2 (FIG. 1) of the three heat-insulated pipe assemblies 1. The other ends of the pipes 2 of the two heat-insulated pipe assemblies 1 are connected to the aqueous urea tank 19. Hence, the pump 20 is capable of circulating the aqueous urea between the pump 20 and the aqueous urea tank 19 through the pipes 2. The other end of the remaining one of the heat-insulated pipe assemblies 1 is connected to the spray nozzle. Hence, the pump 20 sucks the aqueous urea from the aqueous urea tank 19 and supplies the aqueous urea to the spray nozzle through the pipe 2. The spray nozzle sprays the aqueous urea into the exhaust pipe 14.

In the SCR system 12, the antifreeze discharged from the engine 13 is supplied to one end of the hot water pipe 4 (see FIG. 1) of the heat-insulated pipe assembly 1. The antifreeze flows through the hot water pipe 4, and the antifreeze discharged from the other end of the hot water pipe 4 is supplied to the radiator 15. Hence, in the SCR system 12, the aqueous urea flowing through the pipe 2, which is in contact with the hot water pipe 4, is heated by heat exchange with the antifreeze flowing through the hot water pipe 4.

In the SCR system 12, the heat-insulated pipe assembly 1 connecting the pump 20 to the spray nozzle is disposed near the engine room 17 at a high ambient temperature. Specifically, the heat-insulated pipe assembly 1 is disposed near the engine 13, which is a heat source, so that the heat-insulated pipe assembly 1 is disposed in an area in a relatively high ambient temperature in the engine room 17. For this reason, the heat-insulated pipe assembly 1 is exposed to external heat at a high temperature.

In this SCR system 12, the aqueous urea is sprayed to the high-temperature exhaust gas flowing through the exhaust pipe 14. The heat of the exhaust gas results in hydrolysis of urea to ammonia. The resulting ammonia flows downstream through the exhaust pipe 14 together with the exhaust gas and then reaches the SCR catalyst. The SCR catalyst promotes the chemical reaction between ammonia and NOx in the exhaust gas, and NOx is converted into water and nitrogen.

In the above configuration, the heat-insulated pipe assembly 1 according to the embodiment of the present invention includes the pipe 2 allowing the fluid to flow therethrough and a heat insulating member 3 covers at least a part of the pipe 2. The pipe 2 is used in the exhaust gas purification system using the SCR catalyst. The heat insulating member 3 has a closed-cell structure. Hence, the heat-insulated pipe assembly 1 suppresses an increase in the temperature of the fluid due to the heat exchange with air.

Even when the heat-insulated pipe assembly 1 is disposed in the area at the high ambient temperature in the engine room 17 and close to the engine 13, the interior of the pipe 2 is thermally insulated from the exterior by the heat insulating member 3. Thereby, the heat-insulated pipe assembly 1 suppresses the increase in the temperature of the aqueous urea, which flows through the pipe 2, due to the heat exchange with air.

The heat insulating member 3 of the heat-insulated pipe assembly 1 has flexibility and deformed to match the shape of the heat-insulated pipe assembly 1. The heat insulating member 3 is capable of securely covering the bent pipe 2. Thus, the heat-insulated pipe assembly 1 reliably suppresses an increase in the temperature of the aqueous urea flowing through the pipe 2 even when the bent pipe 2 is used.

In the heat-insulated pipe assembly 1, the heat insulating member 3 includes the slit 7 extending in the longitudinal direction, and the pipe 2 and the hot water pipe 4 are inserted into the space within the heat insulating member 3 through the slit 7. Thus, the fabrication of the heat-insulated pipe assembly 1 is facilitated.

In the heat-insulated pipe assembly 1, the pipe 2 and the hot water pipe 4 are fastened together by the binding member 5. Thereby, the area of the contact between the surfaces of the pipe 2 and hot water pipe 4 is increased, so that the efficiency of heat exchange between the pipe 2 and the hot water pipe 4 is improved. Thus, the heat-insulated pipe assembly 1 suppresses the increase in the temperature of the aqueous urea flowing through the pipe 2. In the heat-insulated pipe assembly 1, the pipe 2 and the hot water pipe 4 are fastened together with the binding member 5. Hence, it is easy to cover the pipe 2 and the hot water pipe 4 with the heat insulating member 3, facilitating the fabrication of the heat-insulated pipe assembly 1.

3. Modified Embodiments

The present invention is not limited to the above embodiment and various modifications can be made without departing from the scope of the invention. For example, the materials and shapes of the pipe 2, the heat insulating member 3, the hot water pipe 4, the binding member 5, the fastening member 10, the joints 6a and 6b, and the protective members 8 and 9 may be changed as appropriate.

In the above embodiment, the pipe 2 and the hot water pipe 4 are made from the resin(s) and have flexibility and cylindrical shape(s). The present invention is not limited to the above. The pipe 2 and the hot water pipe 4 may be made from a material other than the resin and may not have flexibility. The pipe 2 and the hot water pipe A may have cross-sectional shape(s) other than a circle.

In the above embodiment, the heat insulating member 3 is a member having flexibility and has the slit 7 extending in the longitudinal direction. The present invention is not limited to this. The heat insulating member 3 may not have flexibility and may not have the slit 7.

In the above embodiment, the heat-insulated pipe assembly 1 includes the hot water pipe 4. The present invention is not limited to this. The heat-insulated pipe assembly 1 may not include the hot water pipe 4. Instead of the hot water pipe 4, a heat wire for heating the fluid may be inserted in the pipe 2. In a case where the heat-insulated pipe assembly 1 does not include the hot water pipe 4, the heat insulating member 3 is in close contact with the pipe 2, so that the gap 27 within the heat insulating member 3 is small.

The heat-insulated pipe assembly 1 described in the above embodiment may include a corrugated tube. For example, the pipe 2 and the hot water pipe 4 may be covered with the corrugated tube. The corrugated tube may be further covered with the heat insulating member 3. The heat insulating member 3 covering the pipe 2 and the hot water pipe 4 may be covered with another corrugated tube. A portion to be covered by the corrugated tube is not particularly limited. The corrugated tube may include a slit extending in the longitudinal direction. In a case where the pipe 2 and the hot water pipe 4 are covered with the corrugated tube and the corrugated tube is covered with the heat insulating member 3, the gaps 27 inside the heat insulating member 3 increase in number, as compared with the case where the pipe 2 and the hot water pipe 4 are directly covered with the heat insulating member 3.

In the above embodiment, the heat insulating member 3 of the heat-insulated pipe assembly 1 is covered with the protective member 8 and the protective member 9. The present invention is not limited to this. The heat insulating member 3 may be covered only with the protective member 8 or only with the protective member 9. The heat insulating member 3 may not be covered with any protective member.

The heat insulating member 3 may include a closing member not shown in the drawing. The closing member covers a part of the surface of the heat insulating member 3, and secures the heat insulating member 3 to prevent the slit 7 from opening. Hence, the heat insulating member 3 is secured such that most of the slit 7 is closed. The closing member may be, for example, a tape-shaped member (the same member as the protective member 9) having high elasticity, adhesion, and heat resistance. In this case, for example, the closing members may be attached to two or more portions of the surface of the heat insulating member 3 such that the closing members intersect the slit 7, thereby securing the slit 7 closed. The closing member may be attached to the surface of the heat insulating member 3, to cover the entire slit 7.

In the heat-insulated pipe assembly 1, the closing member secures the heat insulating member 3 to close the slit 7. Thereby, the heat insulating member 3 securely covers the pipe 2. Hence, the heat-insulated pipe assembly 1 more reliably suppresses the increases in the temperature of the aqueous urea flowing through, the pipe 2.

EXAMPLES

Figure 5:
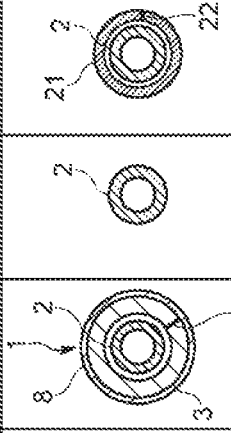
FIG. 5 shows shapes of cross-sections of heat-insulated pipe assemblies.
Figure 5:
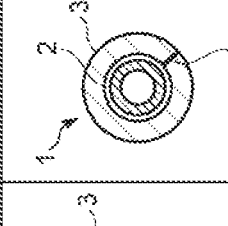
Figure 5:
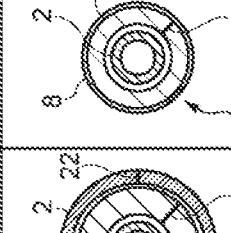
Figure 5:
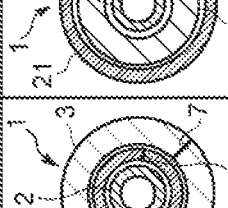
Figure 5:
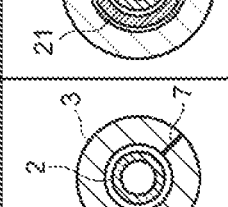
Figure 5:
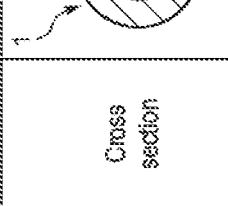
Figure 5:
Figure 5:

To evaluate the heat insulation performance of the heat-insulated pipe assemblies 1, the heat-insulated pipe assemblies 1 according to Examples 1 to 6 were fabricated. FIG. 5 shows the shapes of cross-sections of the heat-insulated pipe assemblies 1 of Examples 1 to 6. In each of the heat-insulated pipe assemblies 1 fabricated according to Examples 1 to 6, the pipe 2 with the length of 1 m includes joints disposed at the respective ends. The pipe 2 is covered with the heat insulating member 3 with the length of 0.95 m or the like. The heat-insulated pipe assembly 1 was fabricated using the following: a resin tube (model number: TEU-4-8x6) was used as the pipe 2; an Aeroflex insulation tube (model number: M10010 for Examples 1 and 3 to 6, and model number: M10016 for Example 2) with the slit 7 was used as the heat insulating member 3; and tesa tape (model number: 51026) having high heat resistance was used as the protective member 8.

In Example 2, the pipe 2 was covered with a corrugated tube 21 (size: 10) having a slit 22. The corrugated tube 21 was then covered with the heat insulating member 3. Thus, the heat-insulated pipe assembly 1 was fabricated.

In Example 3, the pipe 2 was covered with the heat insulating member 3. The heat insulating member 3 was then covered with a corrugated tube 21 (size: 28) having a slit 22. Thus, the heat-insulated pipe assembly 1 was fabricated.

In Examples 5 and 6, the fabricated heat-insulated pipe assembly 1 was left in a constant temperature bath at 120° C. for 24 hours, to be subjected to heat treatment.

Figure 4:
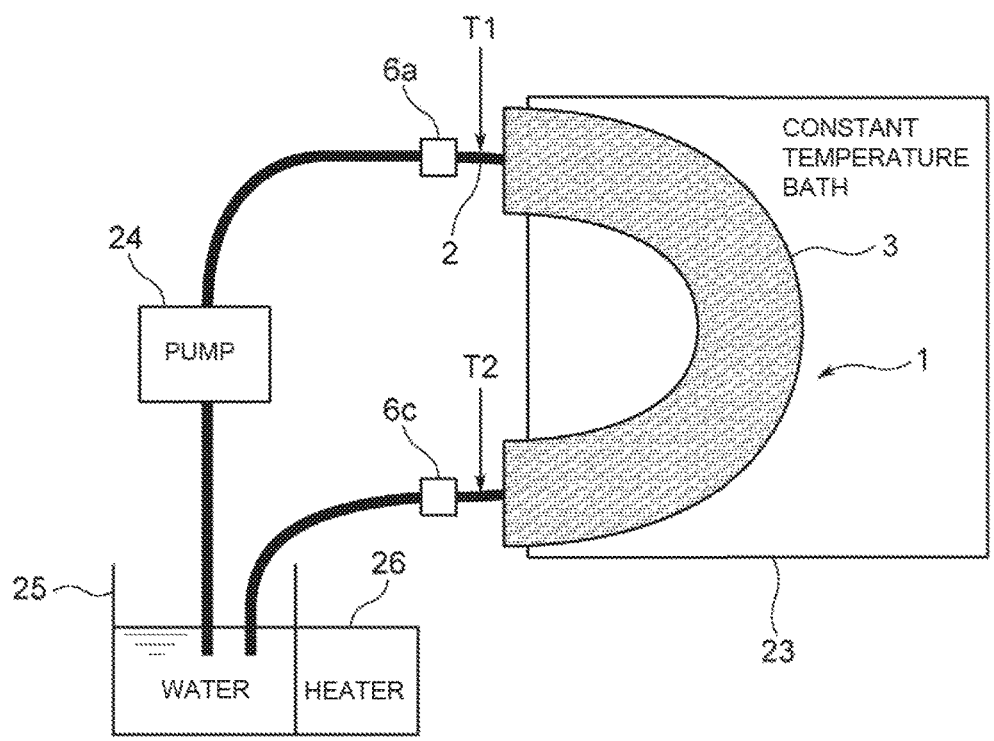
FIG. 4 is a schematic view of a device for evaluating the heat insulation performance of a heat-insulated pipe assembly according to an embodiment of the present invention.

The heat insulation performances of the heat-insulated pipe assemblies 1 according to Examples 1 to 6 were evaluated in the following manner. As shown in FIG. 4, the heat-insulated pipe assembly 1 was disposed such that approximately the entire heat insulating member 3 was accommodated Inside a constant temperature bath 23 and the temperature in the constant temperature bath 23 was then increased to 80° C. Subsequently, with the pump 24 at the flow rate of 24 mL/min, water in the water tank 25 was supplied to the joint 6a of the heat-insulated pipe assembly 1 and water discharged from a joint 6c was returned to the water tank 25. Thus, the water is circulated. Afterwards, the temperature of the heater 26 was adjusted to heat the water, to maintain the temperature (hereinafter referred to as inlet temperature) of the pipe 2 exposed externally at approximately 40° C. at a location T1 between the joint 6a and the heat insulating member 3 disposed in the constant temperature bath 23. After the inlet temperature is stable at approximately 40° C., the temperature (hereinafter referred to as outlet temperature) of the pipe 2 exposed externally at a location T2 between the joint 6c and the heat insulating member 3 was measured. The heat insulation performance of the heat-insulated pipe assembly 1 was evaluated based on a difference between the measured outlet temperature and the measured inlet temperature. Smaller the difference, higher the heat insulation performance of the heat-insulated pipe assembly 1.

For comparison, pipes of Comparative Examples 1 and 2 are fabricated. In Comparative Example 1, a pipe consisting only of a resin tube (model number: TEU-4-8x6) was used instead of the heat-insulated pipe assembly 1. In Comparative example 2, a pipe consisting of the resin tube (model number: TEU-4-8x6) covered with the corrugated tube 21 (size: 10) having the slit 22 was fabricated. The heat insulation performances of the pipes of the Comparative Examples 1 and 2 were evaluated in the same manner as the above. The evaluation is shown in "temperature difference (° C.)" in FIG. 5.

The comparison among the heat-insulated pipe assemblies 1 according to Examples 1 to 6 and the pipes according to Comparative examples 1 and 2 shows that the temperature differences of the heat-insulated pipe assemblies 1 according to Examples 1 to 6 are smaller than those of the pipes according to Comparative examples 1 and 2. This means that the heat-insulated pipe assembly 1 including the heat insulating member 3 with the closed-cell structure has high heat insulation performance. Thus, it was verified that the heat-insulated pipe assembly 1 of the present invention suppresses the increase in the temperature of the fluid flowing through the pipe 2 due to the heat exchange with air.

The comparison between the pipe of Comparative example 1 and the pipe of Comparative example 2 shows that Comparative example 2 including the corrugated tube 21 has a temperature difference smaller than that of Comparative example 1. This demonstrates that the corrugated tube 21 provides heat insulating effects. However, since the temperature difference of Comparative example 2 is larger than the temperature difference of the heat-insulated pipe assembly according to Example 1, the heat insulation performance of the corrugated tube 21 is not adequate.

A comparison between, the heat-insulated pipe assembly 1 according to Example 1 and the heat-insulated pipe assemblies 1 according to Examples 2 and 3 including the corrugated tube 21 shows that the temperature differences of the heat-insulated pipe assemblies 1 according to Examples 2 and 3 are similar to that of Example 1. This shows that the corrugated tube 21 in the heat-insulated pipe assembly 1 does not provide additional heat insulating effects but the heat insulating member 3 provides high heat insulation performance.

A comparison between the heat-insulated pipe assembly 1 according to Example 1 and the heat-insulated pipe assembly 1 according to Example 5, which includes heat treatment, shows that the heat-insulated pipe assembly 1 according to Example 5 has a small outermost diameter. This is due to shrinkage of the heat Insulating member 3. The heat-insulated pipe assembly 1 according to Example 5 has a temperature difference similar to that of the heat-insulated pipe assembly 1 according to Example 1. The heat-insulated pipe assembly 1 according to Example 5 maintains high heat insulation performance despite the shrinkage of the heat insulating member 3 due to the heat treatment. Similarly, a comparison between the heat-Insulated pipe assembly 1 according to Example 4 and the heat-insulated pipe assembly 1 according to Example 6, which includes heat treatment, shows that the heat-insulated pipe assembly 1 according to Example 6 has a small outermost diameter due to shrinkage, but the temperature difference of the heat-insulated pipe assembly 1 according to Example 6 is similar to that of the heat-insulated pipe assembly according to Example 4. Thus, the heat-insulated pipe assembly 1 according to Example 6 maintains high heat insulation performance.

To further examine the heat resistance property of the heat-insulated pipe assembly 1, the heat-insulated pipe assembly 1 was subjected to a long-time heat resistance test. The heat resistance property of the heat-insulated pipe assembly 1 was evaluated by a comparison between heat insulation performances before and after the heat resistance test. The heat insulation performance was evaluated in the same manner as in the above-explained method.

The heat-insulated pipe assembly 1 used in the heat resistance test was fabricated as follows: a resin tube (TEU-4-8x6), which was used as the pipe 2, was covered by Aeroflex (model number: M10010) with a slit, which was used as the heat insulating member 3. Then, tesa tape (model number: 51026), which was used as the protective member 8, and Irrax tape VZL having heat resistance property, which was used as a protective member 9, were wrapped around in this order. Three heat-insulated pipe assemblies 1 (samples A, B, and C) having the same configuration were fabricated. Heat resistance properties of the three heat-insulated pipe assemblies 1 were evaluated.

First, the heat insulation performance of each of the heat-insulated pipe assemblies 1 before the heat resistance test was evaluated by the method described above. Then, the three heat-insulated pipe assemblies 1 were left in a constant temperature bath at 110° C. for 1000 hours. Thus, the heat resistance tests of the three heat-insulated pipe assemblies 1 were performed. Finally, the heat insulation performance of each of the heat-insulated pipe assemblies 1 after the heat resistance test was evaluated by the method described above. Table 1 shows the results. Since temperature differences of the samples A, B, and C before the heat resistance test were the same, Table 1 collectively shows the results in "Before test".

TABLE 1

|  | Before test | After heat resistance test | | |
| --- | --- | --- | --- | --- |
|  |  | Sample A | Sample B | Sample C |
| Inlet temperature (° C.) | 40.0 | 40.0 | 40.0 | 40.0 |
| Outlet temperature (° C.) | 41.4 | 41.9 | 41.4 | 41.9 |
| Temperature difference (° C.) | 1.4 | 1.9 | 1.4 | 1.9 |

As shown in Table 1, the heat-insulated pipe assemblies 1 of the samples A, B, and C exhibit similar temperature differences before and after the heat resistance test, and maintain high heat insulation. This shows that the heat-insulated pipe assemblies 1 have heat resistance.

REFERENCE SIGNS LIST 1 heat-insulated pipe assembly
2 pipe
3 heat insulating member
4 hot water pipe
5 binding member
6a, 6b, 6c joint
7 slit
8, 9 protective member
10 fastening member

The invention claimed is:

1. A heat-insulated pipe assembly comprising:
a pipe allowing a fluid to flow therethrough;
a heat insulating member covering at least a part of the pipe; and
a protective member being a tape-shaped member having elasticity and adhesion, the protective member being helically and closely wrapped around on the heat insulating member, wherein
the pipe is used in an exhaust gas purification system using an SCR catalyst, and
the heat insulating member is an insulation tube having a hollow cylindrical shape, the insulation tube has a slit extending in a longitudinal direction and cutting across from an inner face to an outer face of the insulation tube, the insulation tube is configured to allow the pipe to insert in a hollow portion through the slit, and the heat insulating member has a closed-cell structure and is configured to suppress an increase in a temperature of the fluid due to heat exchange with air.

2. The heat-insulated pipe assembly according to claim 1, wherein the heat insulating member has flexibility.

3. The heat-insulated pipe assembly according to claim 1, wherein the heat insulating member is secured with a closing member such that the slit is closed by the closing member.

4. The heat-insulated pipe assembly according to claim 1, wherein the pipe includes at least one joint at an end of the pipe.

5. The heat-insulated pipe assembly according to claim 1, further comprising a hot water pipe, the hot water pipe being in contact with the pipe, the hot water pipe allowing a heated fluid to flow therethrough.

6. The heat-insulated pipe assembly according to claim 5, wherein the pipe and the hot water pipe are fastened with a binding member.

7. The heat-insulated pipe assembly according to claim 1, further comprising a fastening member being an adhesive tape-shaped member, the fastening member being helically and closely wrapped around an end of the heat insulating member, thereby fixing the end of the heat insulating member to the pipe.

8. The heat-insulated pipe assembly according to claim 1, wherein the heat insulating member is formed from an ethylene propylene diene-based synthetic rubber or a nitrile-based synthetic rubber, and in the closed-cell structure, adjacent foams are not connected to each other and a plurality of foams are independent from each other.

* * * * *

UNITED STATES PATENT AND TRADEMARK OFFICE
CERTIFICATE OF CORRECTION

PATENT NO. : 10,428,995 B2
APPLICATION NO. : 15/515133
DATED : October 1, 2019
INVENTOR(S) : Kei Sugimoto and Kazuhiro Shimamura It is certified that error appears in the above-identified patent and that said Letters Patent is hereby corrected as shown below:

In the Specification

Column 6, Line 17, "the hot water pipe A" should read --the hot water pipe 4--.

Column 7, Line 8, "reliably suppresses the increases" should read --reliably suppresses the increase--.

Signed and Sealed this
Twenty-sixth Day of November, 2019

Andrei Iancu
*Director of the United States Patent and Trademark Office*